United States Patent
Fuhrig et al.

(10) Patent No.: US 6,983,775 B2
(45) Date of Patent: Jan. 10, 2006

(54) TWO-PIECE TIRE WITH IMPROVED TIRE TREAD BELT AND CARCASS

(75) Inventors: Thomas Roy Fuhrig, North Canton, OH (US); Gregory Scott Hanna, Atwater, OH (US); William Earl Rayman, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 182 days.

(21) Appl. No.: 10/457,215

(22) Filed: Jun. 9, 2003

(65) Prior Publication Data

US 2004/0244893 A1 Dec. 9, 2004

Related U.S. Application Data

(60) Continuation-in-part of application No. 10/339,199, filed on Jan. 9, 2003, which is a division of application No. 09/840,385, filed on Apr. 23, 2001, now Pat. No. 6,561,241.

(51) Int. Cl.
*B60C 11/00* (2006.01)
*B60C 11/02* (2006.01)

(52) U.S. Cl. ................ 152/185; 152/187; 152/188; 152/189; 152/209.1; 152/526; 156/128.1

(58) Field of Classification Search ............... 152/185, 152/187, 188, 189, 526, 905, 209.1; 156/128.1
See application file for complete search history.

(56) References Cited

U.S. PATENT DOCUMENTS

| 3,474,848 A | * | 10/1969 | Maiocchi .................... 152/176 |
| 4,050,495 A | * | 9/1977 | Olsen ........................ 152/187 |
| 4,286,644 A | * | 9/1981 | Pond, Jr. ................... 152/531 |
| 5,174,838 A | | 12/1992 | Sandstrom et al. ..... 152/209 R |
| 5,284,195 A | | 2/1994 | Sandstrom et al. ..... 152/209 R |
| 5,336,730 A | * | 8/1994 | Sandstrom et al. ...... 525/332.6 |
| 6,561,241 B2 | * | 5/2003 | Rayman .................. 152/209.1 |
| 2003/0015271 A1 | | 1/2003 | Meza et al. ............. 152/209.5 |

FOREIGN PATENT DOCUMENTS

JP 62119029 * 5/1987

* cited by examiner

*Primary Examiner*—Jeff H. Aftergut
*Assistant Examiner*—Justin Fischer
(74) *Attorney, Agent, or Firm*—John D. DeLong

(57) ABSTRACT

A two-piece tire assembly has a removable tread belt 12 for installing about the circumference of a tire carcass 14. The tread belt has a pair of lateral ends each axially extending beyond the inflated unloaded carcass 14 at the circumferential surface by a distance of at least 4% of the width as measured at the tread belt 12 and carcass 14 interface. The carcass 14 has an abrasion resistant rubber layer 82A at the tread belt interface. The tread belt 12 also has the abrasion resistance tread compound 82B at the carcass 14 interface.

20 Claims, 3 Drawing Sheets

TWO-PIECE TIRE WITH IMPROVED TIRE TREAD BELT AND CARCASS

RELATED APPLICATIONS

This patent application is a continuation-in-part of co-pending U.S. patent application Ser. No. 10/339,199, filed Jan. 9, 2003, a division of U.S. patent application Ser. No. 09/840,385, filed Apr. 23, 2001 now U.S. Pat. No. 6,561,241.

TECHNICAL FIELD

This invention relates to pneumatic tires with tread belts and more particularly to an improved removable tread belt pneumatic tire constructed of a removable tread belt mounted on a radially reinforced beaded tire carcass that is typically for use with earthmoving vehicles.

BACKGROUND OF THE INVENTION

The tread belt pneumatic tires of the present invention are generally designed for use on large earthmover vehicles and are subjected to high stress and loads under harsh environmental conditions such as in rock quarries, mines, foundries, and other areas where tires are subjected to puncture-producing and wear-inducing conditions.

As discussed in U.S. Pat. No. 4,351,380, certain prior art tread belt tire assemblies comprise a plurality of ground-engaging shoes spaced about the periphery of the supporting structure. The heavy loads on the shoes result in great stresses being developed that sometimes lead to premature tire failure. The U.S. Pat. No. 4,351,380 is directed to an improved track belt assembly which comprise a plurality of shoes spaced about the periphery of a load-supporting structure and secured to a reinforcing belt structure disposed on the side of the shoe opposite the ground-engaging side thereof.

The large pneumatic tires, which are typically used for earthmoving vehicles, sometimes fail due to the high stress and loads caused by the harsh environmental conditions in which they are operated. These large prior art pneumatic tires had a greater tendency to fail in one of three tire locations or areas. The first problem area was that the turn-up end of the ply would sometimes break through the sidewall of the tire. A second problem area was a tire failure in the bead area. The third problem area was a tendency to fail in the crown and/or shoulder area of the tire.

In the prior art, conventional solutions to these problems include increasing the gauge of the sidewall to increase the bending stiffness, increasing bead area stiffness and robustness, and decreasing tire deformation under load by increasing the sidewall stiffness. To further improve tire durability, the ply turn-up portion of tires was typically reinforced.

In U.S. Pat. No. 4,609,023, having a common assignee with the present invention, the sidewall inserts were incorporated in the tire carcass to allow the ply structure to conform to its natural shape when the tire is inflated.

The most relevant prior art patent, U.S. Pat. No. 4,050,495, issued Sep. 27, 1977, teaches the use of a removable tread belt installed as an annular belt about the circumference of a tire carcass. The tread belt included laterally extending bars encapsulated in a matrix of rubber. The ends of the bars extended outwardly to a point beyond the widest portion of the carcass sidewall. The tread belt was rigidly supported by the bars at the ends of the tread belt to prevent deflection of the overhanging and otherwise unsupported tread belt at the lateral ends.

With the continual drive to improve earthmover performance, there is a continuing need to provide novel methods and tire designs for improving earthmover tire durability. The present invention is directed to an improved pneumatic tire and removable tread belt assembly with which the frequency of premature tire failure is thought to be substantially reduced. The present invention is also directed to providing an improved pneumatic tire and tread belt assembly which is designed to allow large tires to be transported in several sections and then assembled at the construction site to ease the otherwise difficult problem of transporting the large tires, i.e. sometimes over 13 feet in height and approximately 8,000 to 15,000 pounds. Moreover, the present invention relates to an improved pneumatic tire and removable tread belt assembly with which the driving characteristics of the tire can be more economically changed and the inventory of the number of tire spares that are typically needed can be reduced.

Objects and Summary of the Invention

It is an object of the present invention to provide a pneumatic tire for an earthmover vehicle, the pneumatic tire being as defined in one or more of the appended claims and, as such, having the capability of being constructed to accomplish one or more of the following subsidiary objects.

It is another object of the present invention to provide an improved tire and removable tread belt assembly for an earthmover vehicle wherein the frequency of premature tire failure has been substantially reduced.

Another object of the present invention is directed to providing an improved tire and removable tread belt assembly which is designed to allow large tires to be transported in several sections and then assembled at the delivery site.

Still another object of the present invention is to provide an improved tire and removable tread belt assembly with which the driving characteristics of the tire can be quickly and economically changed.

Yet another object of the present invention is to provide an improved tire and removable tread belt assembly with which the number of tire spares that are stored in inventory can be reduced.

Still another object of the present invention is to provide an improved tire and removable tread belt assembly with a unique tread belt that is restrained from expanding radially outwardly.

A further object of the present invention is to provide an improved tire and removable tread belt assembly wherein the tire treads will maintain a more flat tread profile which will improve tread life and durability.

A still further object of the present invention is to provide an improved tire and removable tread belt assembly wherein the belt is constructed to provide penetration protection.

In accordance with an embodiment of the invention a two-piece tire assembly is disclosed. The two-piece tire assembly has a removable tread belt for installing about the circumference of a tire carcass and a tire carcass having an inflated and unloaded outer circumferential surface having an axial dimension no greater than the axial width of the removable tread belt.

The tread belt has a pair of lateral ends each axially extending beyond the inflated unloaded carcass at the circumferential surface by a distance of at least 4% of carcass width as measured at the tread belt and carcass interface, and wherein the tread belt width is at least equal to or wider than the loaded deflected carcass width as measured at the outer circumferential surface of the carcass.

Each lateral end of the tread belt has a plurality of circumferentially extending substantially zero degree oriented cords in a first reinforcement layer and is radially inwardly flexible under load.

The tread belt preferably has a radially outer surface having a substantially flat tread arc radius $R_1$ between the lateral ends extending from 50% to 75% of the tread belt axial width and a smaller tread arc radius $R_2$ extending from each of the lateral ends to the first tread arc $R_1$, the radially outer tread surface having a sloping surface extending from a tangency to $R_2$ to a lateral end. The radial difference in the tread belt surface as measured at the centerline of the tread belt and each lateral end of the removable tread belt is greater than 0.3% of the outside diameter as measured at the centerline of the tread belt.

The tread belt has a belt reinforcing structure radially outward of the circumferentially extending cords in the first reinforcement layer. The belt reinforcing structure has a pair of cross-plies and a radially outer ply having cords oriented substantially 90 relative to the circumferentially extending cords in a first reinforcement layer.

Definitions

Figure 1:
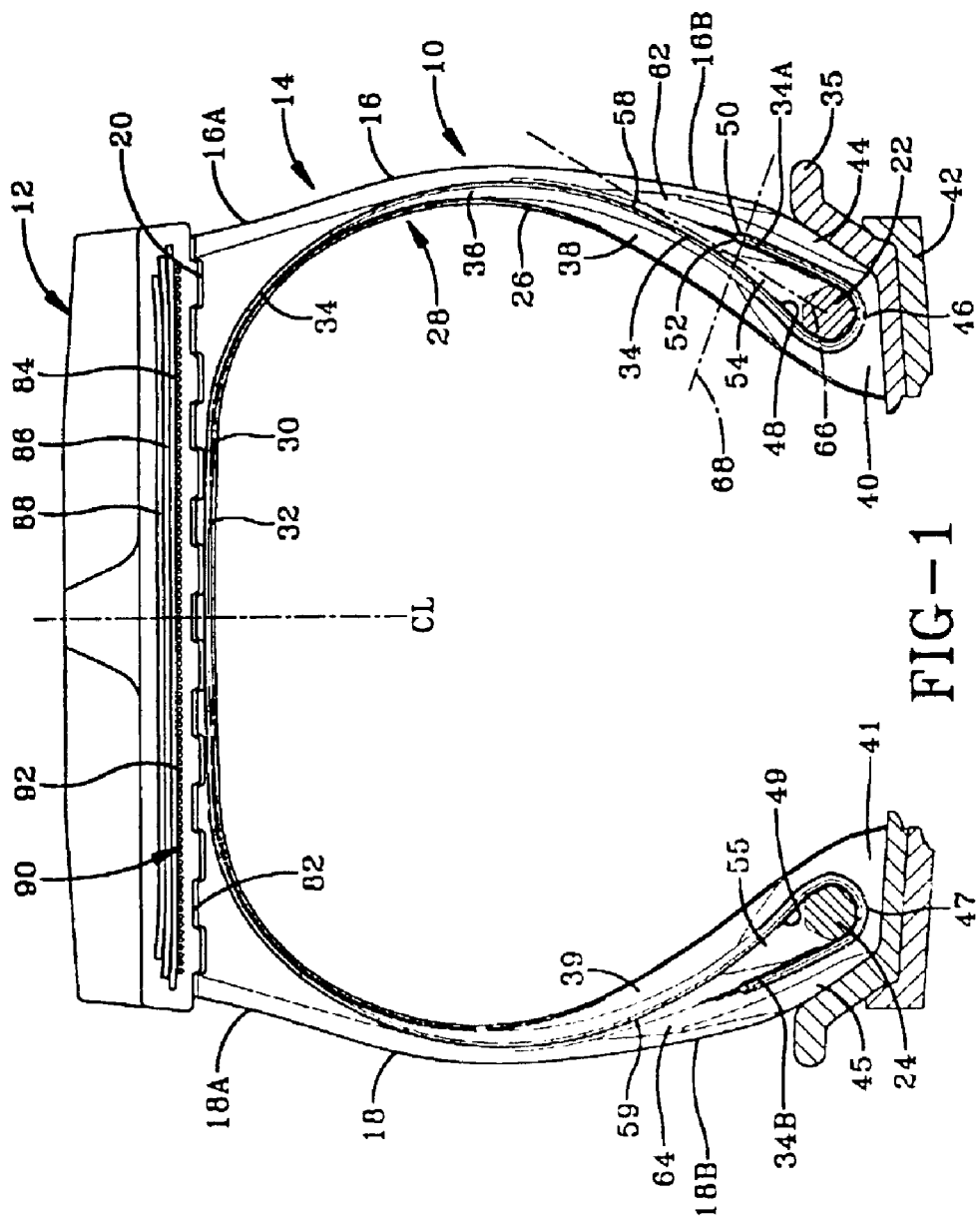
FIG. 1 is a cross-sectional view illustrating the two-piece tire with a removable tire tread belt mounted on an inflatable tire carcass and made in accordance with the present invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 75° with respect to the equatorial plane of the tire.

"Bias ply tire" means a tire having a carcass with reinforcing cords in the carcass ply extending diagonally across the tire from bead core to bead core at about 25–50 angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a belted or circumferentially-restricted pneumatic tire in which the ply cords which extend from bead to bead are laid at cord angles between 65 and 90 with respect to the equatorial plane of the tire.

"Section height (SH)" means the radial distance from the nominal rim diameter to the outer diameter of the tire at its equatorial plane.

DETAILED DESCRIPTION OF THE INVENTION

With reference to FIG. 1, there is illustrated a cross-section of a two-piece pneumatic tire 10 which in the specific exemplary embodiment illustrated is a size 33.00R51 earthmover tire. At an inflation pressure of 102 psi the size 33.00R51 tire has a 119.9 inch (303 cm) maximum inflated outside diameter, a 37.2 inch (94 cm) maximum inflated width tire in the axial directions, and a nominal bead diameter of 51.00 inches (130 cm). The tires are typically inflated to a pressure of about 100 pounds per square inch (psi) with air and sometimes with an air/nitrogen mixture.

The improved tread belt pneumatic tire 10 includes a ground engaging, circumferentially extending tread belt 12 mounted on a radially reinforced, beaded tire carcass 14. The beaded tire carcass 14 generally includes a pair of tire sidewalls 16,18 extending radially inwardly from the outer circumferential surface 20 of the tire carcass and terminating at their radial extremities in a pair of bead wires 22,24, respectively. The sidewalls 16, 18 each have an upper portion 16a, 18a, respectively, in the shoulder region of tire carcass 14 and radially inward of the maximum section width of the tire carcass, and a lower portion 16b, 18b, respectively, adjacent the bead wires 22, 24, respectively, and radially inward of the maximum section width of the tire carcass 14. The details of the construction of tire carcass 14 are described in detail hereinafter.

Tire Carcass

Figure 2:
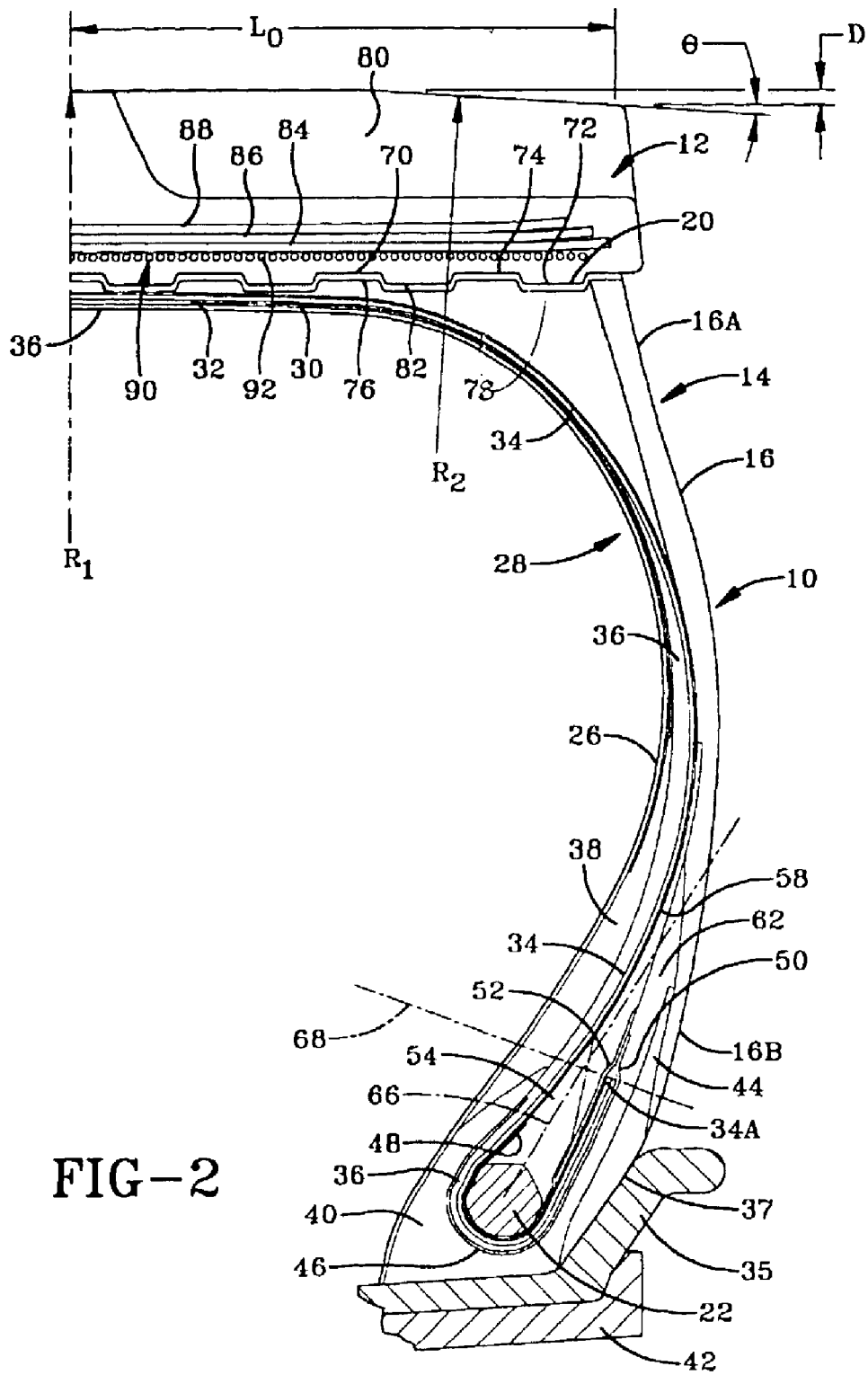
FIG. 2 is an enlarged, cross-sectional view illustrating one side or half of the symmetrical tire shown in FIG. 1 and made in accordance with the present invention.

Referring FIGS. 1 and 2, the details of tire carcass 14 are illustrated. The axially inward surface 28 is an inner ply liner 26 which forms an innerliner that holds the air pressure for inflating tire 10. The inner ply liner 26 covers the entire interior facing surface 28 of the tire carcass 14 and serves to hold the air within the carcass that is used to inflate tire 10. Fabric barrier plies 30 and 32 are provided within the tire carcass 12 in the area of the curved portion of interior surface 28 to provide support for the upper portion of the barrier rubber layer 36 and prevent the barrier rubber from being squeezed through the ply wires in the ply layer 34. While two barrier plies 30 and 32 are illustrated, it is within the terms of the invention to use between zero and four barrier plies, as needed for a specific design.

The carcass 14 also includes in its construction at least one rubberized laminated ply layer 34 of tire cord fabric which extends radially inwardly from the outer circumferential surface 20 of the tire carcass, also called the crown area of the tire carcass, and has turnup ends 34a and 34b which wrap or loop around bead wires 22 and 24, respectively. Although the carcass ply 34 is shown as being of single ply construction, a multi-ply construction can be employed if desired. Preferably, the carcass ply 34 is made of a rubberized ply of steel cord, but it can be made of a non-steel carcass reinforcing material.

At the radially outermost portion of the carcass 14 there is a thin layer of abrasion resistant tread compound 82A. The abrasion resistant tread compound 82A forms a tough durable long wearing surface between the tread belt 12 and the carcass 14. The use of tread rubber is an ideal material because it is adapted to form grooves and ridges or as shown in FIGS. 1 and 2, the lands 76 and grooves 78, which are used to retain the belts.

Between the innerliner 26 and the ply layer 34 is a barrier rubber layer 36 which backs up the entire length of ply layer 34 and is formed of a soft compound of rubber which squeezes against the ply layer 34. Annular stiffeners, known as apexes or apex elements 38,39 herein, each having a generally triangular shape are provided radially outward of the bead wires 22,24, respectively, and between the barrier rubber 36 and the innerliner 26. The apexes 38,39 extend from approximately the mid-sidewall and the area of innerliner 26 radially outward from the bead wires 22, 24, respectively, for stiffening the bead area to help prevent the tire from bending over the flange 35. Axially outward from apexes 38,39 and between the ply layer 34 where it turns up about bead wires 22,24 are located lower gum chafers 40, 41, respectively, that support the bead wires 22, 24, respectively, in the area of the wheel mounting rim 42 and to prevent chafing of the tire by an adjacent wheel mounting rim. Upper gum chafers 44, 45 are disposed against the lower gum chafers 40, 41, respectively, and the lower tire sidewalls 16b, 18b, respectively, to provide support for the bead wires 22, 24 in the area of the flange 35 and to prevent chafing of the tire by an adjacent wheel mounting rim.

Between the lower chafers 40, 41 and the rubber barrier 36 in the area partially surrounding bead wires 22, 24 are located fabric or wire chafer plies 46, 47 that support the bead wires 22, 24, respectively. As best seen in FIGS. 2 and 2A, the chafer plies 46 are primarily disposed against the inner facing surfaces of lower chafers 40, 41. Between the inner surface of ply layer 34 and the bead wires 22 and 24 are located flippers 48, 49, respectively, which are reinforced fabric materials that are wrapped about the bead core and at least a portion of one of the apexes. On either side of the ends 34a, 34b of ply layer 34 are two wire coat, gum layers 50 and 52 which cover the ends 34a, 34b, respectively, of ply 34 and enable the movement of ply 34 between the gum layers 50 and 52 without exposing the wire within ply 34 during tire construction or severe bending of the tire.

Apex Configuration

Two annular stiffeners, referred to as apexes 54, 55 herein, each having a generally four sided shape, are provide radially outward of the bead wires 22,24, respectively, between flippers 48,49, and out to apexes 58, 59, for stiffening the area about the bead wires 22, 24, respectively, to help prevent the tire from bending over the flange 35. The apexes 54, 55 are further disposed between the lower inner end of rubberized ply layer 34 and the turn-up ends 34a and 34b. Abutted against and extending radially outward from the apexes 54 and 55 are two annular stiffeners, referred to herein as apexes 58 and 59, respectively, which help support the ends 34a and 34b of rubberized ply layer 34. The apexes 54, 55, are constructed of a relatively hard compound having a modulus of about 12.2–14.9 megapascals/cm2 at 200% elongation. Axially outward from the apexes 58 and 59 are the outer apexes 62 and 64, respectively. The apexes 38, 39, 58, 59, and 62, 64 are generally constructed of the same relatively soft rubber compound having a modulus of about 7.2–8.8 megapascals/cm2 at 200% elongation and act to provide a soft cushion that absorbs the stresses around the turn up ends 34a and 34b of the ply layer 34 which is caused by stress forces generated by the flexing of the tire. While the apexes 38, 39, 58, 59, and 62, 64 are typically constructed of the same rubber compound, it is within the terms of the invention to construct one or more of the apexes with a different modulus within the range of between about 7.2 and 8.8 megapascals/cm2 at 200%. In the preferred embodiment, the apexes 38, 39, 58, 60, 62 and 64 are softer than the apexes 54 and 55 which are located directly adjacent and radially outward from the bead wires 22 and 24, respectively. Preferably the rubber compound used to form the apexes 54 and 55 are about 20% to about 50%, and preferably about 20% to about 50% stiffer than the rubber compound used to form apexes 38, 39, 58, 59, 62 and 64.

Figure 3:
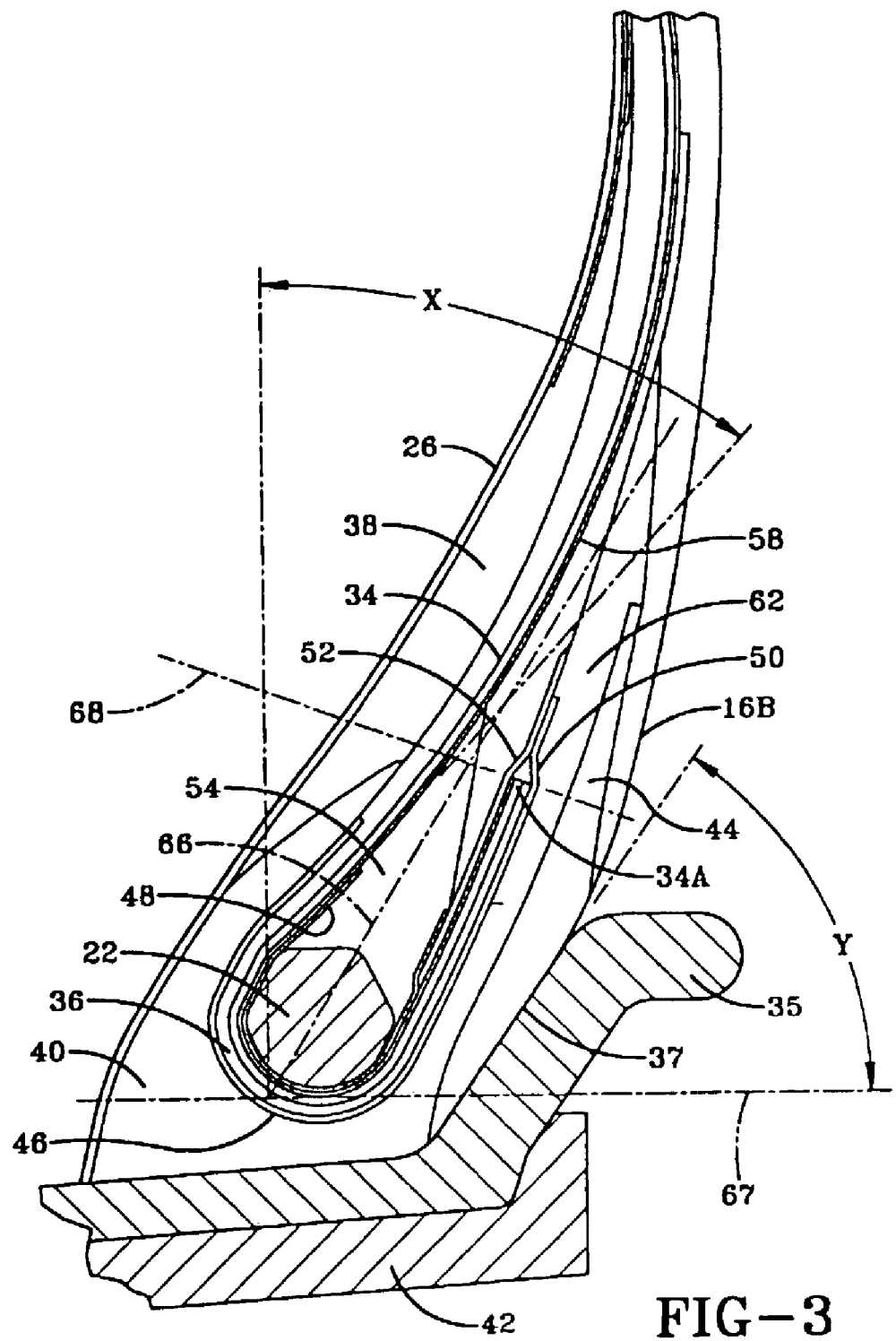
FIG. 3 is an enlarged, cross-sectional view illustrating the bead area of the tire shown in FIG. 2.

The location of the ply turn-up ends 34a and 34b are an important aspect of the carcass design. As best illustrated in FIG. 3, preferably the turn-up ends 34a, 34b are located radially outward a distance of between about 2 and 3 bead diameters from the intersection of a centerline 66 which extends through the center of bead wires 22, 24 and a line 67 which is tangent to the most radially inward surface of the carcass ply 34 where the carcass ply portions 34a, 34b loop around the wire beads 22, 24 to a line 68 which is perpendicular to centerline 66 and is tangent to the outer end of the ply layer 34. This location of the outer ends of the turn-up ends 34a, 34b of ply layer 34 is important in that it can withstand the pressure exerted against the ply end, which was sometimes sufficient to cause the ply end to break through the sidewall in prior art constructions where the turn-up ends extend closer to the center of the tire sidewalls. The advantage of having the outer ends of the turn-up ends 34a, 34b of carcass ply 34 at a lower position closer to the radial outward portion of the flange 35 is so that when operating conditions cause the tire to deflect outwards, the ends of turn-up ends 34a, 34b of the ply layer 34 will be supported by flange 35. This arrangement will greatly reduce the possibility that the outer ends of turn-up ends 34a, 34b will be the cause of a crack in or penetrate axially outward through the sidewall of the tire carcass 14.

The ply line of ply layer 34 follows the natural ply line, which means it is already at its natural shape upon inflation.

The carcass ply 34 retains its natural shape when inflated to reduce the inflation strain on the tire. The portion of the ply cord extending down to the bead 22 is equally supported along its length by the axially interior surface 37 of the rim flange 35 which is substantially parallel to the centerline 66 passing though beads 22, 24.

Tread Belt

The ground engaging, circumferentially extending tread belt 12 is removably mounted onto the tire carcass 14. As best shown in FIG. 2, the underside or inner circumference surface 70 of tread belt 12 comprises a plurality of annular lands 72 and grooves 74 that mate with lands 76 and grooves 78 of tire carcass 14 to restrain belt 12 from lateral or axial movement with respect to the carcass 14. The tire tread belt 12 includes a tread portion 80 and a plurality of tread belts 84, 86, and 88 (84–88). A radially inner belt layer 84 and 86 have cords of steel having a core strand surrounded by sheath strands. The core strand preferably has a plurality of three filaments forming the core. The wire construction is as described in co-pending application Ser. No. 09/507,316, filed Feb. 18, 2000, entitled STEEL CORD FOR REINFORCING ELASTOMERIC ARTICLES which is incorporated by reference herein in its entirety. Each tread belt layer 84, 86 has the cords oriented at an angle of 15° to 80° relative to the circumferential direction and spaced at 4 ends per inch. These adjacent layers 84, 86 being equal but oppositely oriented.

At the radially innermost portion of the tread belt 12 there is a thin layer of abrasion resistant tread compound 82B. The abrasion resistant tread compound 82B forms a tough durable long wearing surface between the tread belt 12 and the carcass 14. The use of tread rubber is an ideal material because it is adapted to form grooves and ridges or as shown in FIGS. 1 and 2, the lands 76 and grooves 78, which are used to retain the belts. In order to avoid exposure of the wires 92 upon wear of the abrasion resistant tread compound 82B, the thickness or gauge of the abrasion resistant tread compound 82B is generally at least 0.1 inches in the region of the grooves 78. In another embodiment, the thickness is at least 0.3 inches. The thickness or gauge in the region of the lands 76 is equal to the thickness in the region of the groove 78 plus the height of the land 76.

The radially outermost third layer 88 has the steel cords oriented at 90° relative to the circumferential direction. This in combination with the belt layers 84, 86 creates a very strong construction. Radially inward of these belt reinforcement layers is a unique first reinforcement layer 90 having cords 92 oriented 0° relative to the circumferential direction, preferably spaced at 3 EPI.

While three tread belts 84–88 are illustrated, it is within the scope of the invention to use other numbers of tread belt layers as needed. The combination of a removable tire tread belt 12 with a tire carcass 14 for use with large earthmoving vehicles is important in that it enables a portion of a tire 10 to be replaced instead of the entire tire in the event that one portion of the tire, i.e., the tire belt 12 or the tire carcass 14, wears out before the other part. Also, it may be desirable to have different types of tread designs such as, for example, driving or steering tread designs. This feature allows for a less expensive means of changing the tire tread to construct the appropriate style of desired tire. This feature would greatly reduce the cost of storing spare tires and could even extend the operating time of the tires.

A unique aspect of the present invention is the provision of zero degree wires 92 in the first reinforcement layer 90. The zero degree wires in layer 90 encircle the tire tread belt 12 and are provided to restrict the radially outward growth of the tread belt 12 due to a serious deflection in the tire carcass. By keeping the tire tread belt 12 from expanding radially outward, the tire's tread will maintain a more flat tread profile which will improve tread life and durability. The zero degree 92 wires in first reinforcement layer 90 eliminate the need for a larger number of belt layers.

With particular reference to the first reinforcement layer 90 it is believed most beneficial to have the axially outer-most cords 92 axially inward of the lateral ends of the belt layers 84 and 86. As shown the lateral ends of the belt layer 84 overhang the adjacent first reinforcement layer 90 and project axially outward from the lateral ends of belt layer 86. By insuring the belt layers 84 and 86 overhang or extend beyond the zero degree cords 92 of the first reinforcement layer 90 provides added protection against cut damage of the cords 92. As can be easily appreciated as a large sharp rock is rolled over in the path of the tread belt, the lateral ends of the tread belt can deflect and the belt layers 84, 86 by overhanging actually can bend over the zero degree cords 92 stopping the rock from cutting those cords.

The primary advantage of the tread belt design in the region of the lateral edges is the fact that the lateral edge portions of the tread belt 12 at the surface adjoining the circumferentially outer surface of the carcass 14 extend beyond the carcass 14 as shown at the interface 20 of the tread belt 12 and the carcass 14. This increases the flexibility of the tread belt 12 and improves the handling characteristics of the tire 10. The outer surface of the tread has an inclination of θ, θ being about 4° slope in the lateral portions of the tread and is flat or 0° sloped in the central region. The flat shaped central region extends at least 50% of the total tread width. In the 31.00R51 design, the central portion extends over 9.00 inches and each lateral portion extends from the central portion 25% or less of the total tread width, or about 7.00 inches in the 31.00R51 tire size of the preferred embodiment tire.

This transition of the tread surface in the region Lo from sloping flat 0° to a 4° radially inward slope creates a shoulder drop-off (D) of at least 10 mm. This feature lowers the tread belt 12 contact pressure in the lateral portions and this generally reduces the shoulder wear particularly in the steering wheel positions. An added benefit is noted in that the deflection of the lateral portion is enhanced by a reduction in the radial height of the tread created by the shoulder drop-off (D). This means that the thinner tread at the lateral ends is easier to deflect radially outwardly but almost paradoxically the amount of inward pressuring trying to deflect inwardly the tread edge is lowered by the sloping shoulder. In combination this insures that while the tread belt is deliberately made flexible at the lateral edge to accommodate large stones and rock, preferably, the entire central region of the tread has even footprint pressures at the crown wherein the tread is fully supported. Ideally, the footprint pressure at the shoulders of the tread are equal to, or slightly less than, the central region.

At the interface between the carcass 14 and the tread belt 12 it is believed important that the tread belt 12 overhangs the inflated and unloaded carcass by an amount of at least 15 mm or 4% of the carcass width as measured at the interface 20. As the tire 10 is placed under normal load the carcass 14 expands radially outwardly to a location almost aligned with the lateral end of the tread belt 12. It is believed undesirable to have the carcass 14 at the tread belt 12 interface to be extending laterally outward of the tread belt 12. The subtle relative movement of the tread belt 12 to the carcass 14 means that to insure the carcass 14 is not exposed requires the tread belt 12 to actually overhang the carcass 14 at the interface. While large amounts of overhang may be feasible it is considered inefficient to allow the tread belt 12 to extend beyond the maximum section width of the carcass. This is true for several reasons, first being each 1 inch of axial tread belt width on large sized tires such as 33.00R51 tire weighs approximately 100 lbs., secondarily the tread thickness is about 5.00 inches or greater and the distance to a location of the maximum section width of the carcass is another 24 inches meaning the rocks and debris most likely to damage the carcass 14 will strike at the tread belt interface. Rocks 30 inches or greater simply are too unlikely to be traversable in the quarry and therefore create no realistic threat to carcass damage, thirdly because the present invention has the lateral edges to be of a reduced stiffness to facilitate some degree of deflection radially inwardly, too large of an overhang could lead to flexure fatigue in the first reinforcement layer 90 requiring stiffening of the tread belt as was done in the prior art patent U.S. Pat. No. 4,050,495.

It is apparent that there has been provided in accordance with this invention apparatus and methods for constructing an improved tire 10 and removable tread belt assembly wherein the tire durability has been substantially increased by the inclusion of an improved apex construction. The improved tire and removable track belt assembly allow large tires to be transported in several sections and then assembled at the delivery site. Further, the removable tread belt assembly allows a different tread belt 12 to be applied to a tire carcass 14 so as to alter the driving characteristics of the tire quickly and economically.

The abrasion resistant tread compound 82A,B may comprise between about 50 and about 100 parts by weight of natural or synthetic polyisoprene. The component may also include between about 0 and about 20 parts by weight of polybutadiene and 0 to about 50 phr of styrene-butadiene rubber, to make up a total 100 parts by weight of elastomer.

Other elastomers that may be used along with the natural or synthetic polyisoprene in the abrasion resistant tread compound 82A,B may include various general purpose elastomers as are known in the art. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene and SBR.

In one aspect, the rubber to be combined with the natural or synthetic polyisoprene in the abrasion resistant tread compound 82A,B is preferably one or more diene-based rubbers. For example, one or more rubbers is preferred such as styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

The abrasion resistant tread compound 82A,B may include from about 10 to about 100 phr of a filler selected from carbon black and silica. Alternatively, the abrasion resistant tread compound 82A,B may include from about 30 to about 70 phr of a filler selected from carbon black and silica.

The commonly-employed siliceous pigments which may be used in the abrasion resistant tread compound 82A,B include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly-employed carbon blacks can be used as a conventional filler in the abrasion resistant tread compound 82A,B. Representative examples of such carbon blacks include N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It may be preferred to have the abrasion resistant tread compound 82A,B to additionally contain a conventional sulfur-containing organosilicon compound. Examples of suitable sulfur-containing organosilicon compounds are of the formula:

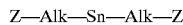

in which Z is selected from the group consisting of

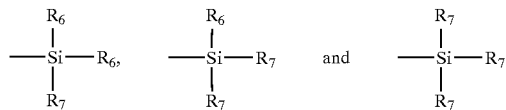

where $R_6$ is an alkyl group of 1 to 4 carbon atoms, cyclohexyl or phenyl; $R_7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur-containing organosilicon compounds which may be used in the abrasion resistant tread compound 82A,B include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds for use in the abrasion resistant tread compound 82A,B are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore, as to formula I, preferably Z is

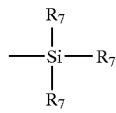

where $R_7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur-containing organosilicon compound of formula I in the abrasion resistant tread compound 82A,B will vary depending on the level of other additives that are used. Generally speaking, the amount of the compound of formula I will range from 0.5 to 20 phr. Preferably, the amount will range from 1 to 10 phr.

The abrasion resistant tread compound 82A,B may contain one or more heat reactive resin systems to improve tear resistance. Such heat reactive resins may include those comprising a "methylene donor" and a "methylene acceptor". The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor are resorcinol, unmodified phenol novolak resins, modified phenol novolak resin, resorcinol novolak resins and mixtures thereof. Examples of modified phenol novolak resins include cashew nut oil modified phenol novolak resin, tall oil modified phenol novolak resin and alkyl modified phenol novolak resin.

The amount of methylene acceptor that is included in the abrasion resistant tread compound 82A,B may vary depending on the type of rubber, the particular methylene acceptor, the particular methylene donor and the desired physical properties, i.e., adhesion and tear. Generally speaking, the amount of methylene acceptor may range from about 0.1 to about 10 phr. Preferably, the amount of methylene acceptor ranges from about 0.5 to about 5.0 phr.

The abrasion resistant tread rubber 82A,B contains a methylene donor which is suitable for reaction with the methylene acceptor. Examples of methylene donors which are suitable for use in the present invention include hexamethylenetetramine, hexaethoxymethylmelamine, hexamethoxymethylmelamine, lauryloxymethoxypyridinium chloride, ethoxymethylpyridinium chloride, trioxan hexamethoxymethylmelamine, the hydroxy groups of which may be esterified or partially esterified, and polymers of the methylene donors may be N-substituted oxymethylmelamines of the formula:

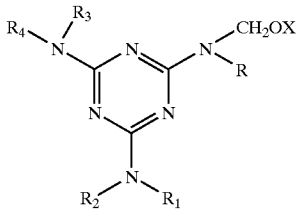

wherein X is an alkyl having from 1 to 8 carbon atoms, R, $R_1$, $R_2$, $R_3$, and $R_4$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N',N"-trimethylolmelamine. The N-methylol derivatives of melamine are prepared by known methods.

The amount of methylene acceptor that is present in the abrasion resistant tread compound 82A,B may vary depending on the type of rubber, the particular methylene acceptor, the particular methylene donor and the desired physical properties, i.e., adhesion and tear. Generally speaking, the amount of methylene donor may range from about 0.1 to about 10 phr. Preferably, the amount of methylene donor ranges from about 0.5 to about 5.0 phr.

The weight ratio of methylene donor to methylene acceptor can vary. Generally speaking, the weight ratio will range from about 1:10 to about 10:1. Preferably, the weight ratio ranges from about 1:3 to 3:1.

The term "phr" as used herein, and according to conventional practice, refers to "parts by weight of a respective material per 100 parts by weight of rubber, or elastomer."

It is readily understood by those having skill in the art that the abrasion resistant tread compound 82A,B would be compounded by methods generally known in the rubber compounding art, such as mixing the various sulfur-vulcanizable constituent rubbers with various commonly-used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. The abrasion resistant tread compound 82A,B may include from about 0 to 15 phr of softeners including tackifier resins and processing oils. Typical amounts of tackifier resins, if used, comprise about 0.5 to about 10 phr, usually about 1 to about 5 phr. Typical amounts of processing oils comprise about 1 to about 15 phr. Such processing oils can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used in the abrasion resistant tread compound 82A,B to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of in the abrasion resistant tread compound 82A,B can be accomplished by methods known to those having skill in the rubber mixing art. For example the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the tire assembly is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The two-piece assembly offers better traction, wear, and footprint, along with quicker field changeover and tire replacement. In order to deliver required tire durability in service, the abrasion resistant tread compound 82A,B must be of sufficient gauge to eliminate/reduce excessive rubbing which could lead to wire exposure. The compound formulation can consist of a mixture of diene rubbers, primarily polyisoprene, with secondary polymers of the SBR or PBD type, ranging from 20 to 50 phr. Fillers can be HAF or ISAF, with or without silica fillers of 150 to 175 surface area. Also included can be a heat-reactive resin system, together with 4 to 6 phr aromatic processing oil. Compound physicals range from 4.6 to 11.5 $MN/m^2$, tensile-at-break from 12 to 24 $MN/m^2$, and elongation range from 525 to 625 percent. Abrasion rates vary from 8.25 to 13.95 mg/km at 12 degree slip angle, 70 N Load (Grosch abrasion tester).

EXAMPLE

In this Example, several rubber compounds were mixed and cured to be tested for physical properties. Compound recipes for samples 1–5 are given in Table 1. Rubber compounds were mixed following standard techniques and cured at 135° C. for 140 minutes. In addition to the components listed, the compounds included standard amounts of curatives and antidegradants. Physical properties were measured for each cured compound following standard test protocols. Results of physical property tests are given in Table 2.

TABLE 1

| Compound Recipes Sample | 1 | 2 | 3 | 4 | 5 |
|---|---|---|---|---|---|
| Natural Rubber | 100 | 80 | 70 | 50 | 50 |
| Styrene-Butadiene Rubber | 0 | 20 | 30 | 0 | 0 |
| Polybutadiene | 0 | 0 | 0 | 50 | 50 |
| HAF Carbon Black | 30 | 0 | 50 | 50 | 45 |
| ISAF Carbon Black | 0 | 48 | 0 | 0 | 0 |
| Silica | 20 | 7 | 0 | 0 | 0 |
| Resin | 2.25 | 0 | 0 | 0 | 13 |
| Oil | 4 | 6 | 5 | 13 | 6 |

TABLE 2

| Physical Properties Sample | 1 | 2 | 3 | 4 | 5 |
|---|---|---|---|---|---|
| 300% Modulus, MPa | 9.3 | 7.3 | 10.7 | 12 | 5.3 |
| Tensile Strength at Break, MPa | 27 | 24.2 | 20 | — | 16.4 |
| Elongation at Break, % | 620 | 670 | 485 | 460 | 680 |
| Rebound, % | 71.2 | 54.5 | 56.8 | 47.6 | 46.7 |
| DIN abrasion | 162 | 142 | — | 93 | 68 |
| Peel Tear | 182 | 161 | 92 | 83 | 126 |

What is claimed is:

1. A two-piece tire assembly having a removable tread belt for installing about the circumference of a tire carcass and a tire carcass having an inflated and unloaded outer circumferential surface having an axial dimension no greater than the axial width of the removable tread belt, the two-piece tire assembly being characterized by:
   the carcass having a radially outermost and the tread belt having a radially innermost layer made of tread rubber, each tread rubber layer forming an abrasion resistance surface between the tread belt and the carcass, the tread rubber comprising per 100 parts by weight of elastomer (phr):
   from about 50 to about 100 phr of natural or synthetic polyisoprene;
   from about 0 to about 20 phr of a polybutadiene;
   from about 0 to about 50 phr of a styrene-butadiene rubber; and
   from about 10 to about 100 phr of a filler selected from carbon black and silica;
   wherein said tread rubber has a modulus ranging from about 4.6 to about 11.5 MN/m2; a tensile strength of from about 12 to about 24 MN/m2; and an elongation of from about 525 to about 625 percent.

2. The two-piece tire assembly of claim 1, wherein said tread rubber further comprises from about 30 to about 70 phr of a filler selected from carbon black and silica.

3. The two-piece tire assembly of claim 1, wherein said tread rubber further comprises from about 0 to about 10 phr of a softener selected from tackifying resins and processing oils.

4. The two-piece tire assembly of claim 1, wherein said tread rubber further comprises from 0 to about 15 phr of a heat reactive resin system.

5. The two-piece tire assembly of claim 1, wherein said tread rubber further comprises from about 0 to about 15 phr of a heat reactive resin system comprising at least one methylene donor and at least one methylene acceptor; said at least one methylene donor selected from the group consisting of hexamethylenetetramine, hexaethoxymethylmelamine, hexamethoxymethylmelamine, lauryloxymethoxypyridinium chloride, ethoxymethylpyridinium chloride, trioxan hexamethoxymethylmelamine, the hydroxy groups of which may be esterified or partially esterified, and polymers of the methylene donors may be N-substituted oxymethylmelamines of the formula:

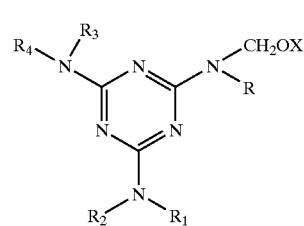

wherein X is an alkyl having from 1 to 8 carbon atoms, R, $R_1$, $R_2$, $R_3$, and $R_4$ are individually selected from the group consisting of hydrogen, an alkyl having from 1 to 8 carbon atoms, the group —$CH_2OX$ or their condensation products; and said at least one methylene acceptor selected from the group consisting of resorcinol, unmodified phenol novolak resins, modified phenol novolak resin, and resorcinol novolak resins.

6. The two-piece tire assembly of claim 1, wherein said tread rubber of the tread belt has a gauge of at least 0.1 inches.

7. The two-piece tire assembly of claim 1, wherein said tread rubber of the tread belt has a gauge of at least 0.3 inches.

8. The two-piece tire assembly of claim 1, wherein said tread rubber has an abrasion rate of from about 8.25 to about 13.95 mg/km, measured at a 12 degree slip angle and a 70 N load.

9. The two-piece tire assembly of claim 1 wherein the tread belt has a rubber tread, the rubber tread material being the same as the tread rubber layer of the carcass.

10. The two-piece tire assembly of claim 1, the tread belt having a pair of lateral ends each axially extending beyond the inflated unloaded carcass at the outer circumferential surface of the carcass by a distance of at least 4% of carcass width as measured at the tread belt and carcass interface and wherein the tread belt width is at best equal to or wider than the loaded deflected carcass width as measured at the outer circumference of the carcass, each lateral end of the tread belt having a plurality of circumferentially extending cords in a first reinforcement layer and being radially inwardly flexible under load.

11. The two-piece tire assembly of claim 10 wherein the removable tread belt has a radially outer surface having a substantially flat tread arc radius $R_1$ between the lateral ends extending from 50% to 75% of the tread belt axial width and a smaller tread arc radius $R_2$ extending from the first tread arc $R_1$, the tread outer surface having a sloping surface extending from a tangency to $R_2$ to a lateral end, the radial difference in the tread belt surface as measured at the centerline of the tread belt and each lateral end of the removable tread belt being greater than 0.3% of the outside diameter as measured by the centerline of the tread belt.

12. The two-piece tire assembly of claim 10 wherein the removable tread belt further comprises a belt reinforcing structure radially outward of the circumferentially extending cords in the first reinforcement layer.

13. The two-piece tire assembly of claim 12 wherein the belt reinforcing structure has a pair of cross-plies and a radially outer ply having cords oriented substantially 90 relative to the circumferentially extending cords in a first reinforcement layer.

14. A two-piece tire assembly having a removable tread belt for installing about the circumference of a tire carcass and a tire carcass having an inflated and unloaded outer circumferential surface having an axial dimension no greater than the axial width of the removable tread belt, the two-piece tire assembly being characterized by:
the carcass having a radially outermost and the tread belt having a radially innermost layer made of tread rubber, each tread rubber layer forming an abrasion resistance surface between the tread belt and the carcass, the tread rubber comprising per 100 parts by weight of elastomer (phr):
from about 50 to about 100 phr of natural or synthetic polyisoprene;
from about 0 to about 20 phr of a polybutadiene;
from about 0 to about 50 phr of a styrene-butadiene rubber; and
from about 10 to about 100 phr of a filler selected from carbon black and silica;
wherein said tread rubber has an abrasion rate of from about 8.25 to about 13.95 mg/km, measured at a 12 degree slip angle and a 70 N load.

15. The two-piece tire assembly of claim 14, the tread belt having a pair of lateral ends each axially extending beyond the inflated unloaded carcass at the outer circumferential surface of the carcass by a distance of at least 4% of carcass width as measured at the tread belt and carcass interface and wherein the tread belt width is at best equal to or wider than the loaded deflected carcass width as measured at the outer circumference of the carcass, each lateral end of the tread belt having a plurality of circumferentially extending cords in a first reinforcement layer and being radially inwardly flexible under load.

16. The two-piece tire assembly of claim 15 wherein the removable tread belt has a radially outer surface having a substantially flat tread arc radius $R_1$ between the lateral ends extending from 50% to 75% of the tread belt axial width and a smaller tread arc radius $R_2$ extending from the first tread arc $R_1$, the tread outer surface having a sloping surface extending from a tangency to $R_2$ to a lateral end, the radial difference in the tread belt surface as measured at the centerline of the tread belt and each lateral end of the removable tread belt being greater than 0.3% of the outside diameter as measured by the centerline of the tread belt.

17. A two-piece tire assembly having a removable tread belt for installing about the circumference of a tire carcass and a tire carcass having an inflated and unloaded outer circumferential surface having an axial dimension no greater than the axial width of the removable tread belt, the two-piece tire assembly being characterized by:
the carcass having a radially outermost and the tread belt having a radially innermost layer made of tread rubber, each tread rubber layer forming an abrasion resistance surface between the tread belt and the carcass, the tread rubber comprising per 100 parts by weight of elastomer (phr):
from about 50 to about 100 phr of natural or synthetic polyisoprene;
from about 0 to about 20 phr of a polybutadiene;
from about 0 to about 50 phr of a styrene-butadiene rubber; and
from about 10 to about 100 phr of a filler selected from carbon black and silica;
wherein the tread belt has a rubber tread, the rubber tread material being the same as the tread rubber layer of the carcass.

18. The two-piece tire assembly of claim 17, the tread belt having a pair of lateral ends each axially extending beyond the inflated unloaded carcass at the outer circumferential surface of the carcass by a distance of at least 4% of carcass width as measured at the tread belt and carcass interface and wherein the tread belt width is at best equal to or wider than the loaded deflected carcass width as measured at the outer circumference of the carcass, each lateral end of the tread belt having a plurality of circumferentially extending cords in a first reinforcement layer and being radially inwardly flexible under load.

19. The two-piece tire assembly of claim 18 wherein the removable tread belt has a radially outer surface having a substantially flat tread arc radius $R_1$ between the lateral ends extending from 50% to 75% of the tread belt axial width and a smaller tread arc radius $R_2$ extending from the first tread arc $R_1$, the tread outer surface having a sloping surface extending from a tangency to $R_2$ to a lateral end, the radial difference in the tread belt surface as measured at the centerline of the tread belt and each lateral end of the removable tread belt being greater than 0.3% of the outside diameter as measured by the centerline of the tread belt.

20. The two-piece tire assembly of claim 18 wherein the removable tread belt further comprises a belt reinforcing structure radially outward of the circumferentially extending cords in the first reinforcement layer.

* * * * *